United States Patent [19]

Clement

[11] 4,037,982
[45] July 26, 1977

[54] MACHINE TOOLS

[75] Inventor: Gilbert-Louis Clement, Semeac, France

[73] Assignee: Infranor S.A., Switzerland

[21] Appl. No.: 620,793

[22] Filed: Oct. 8, 1975

Related U.S. Application Data

[63] Continuation-in-part of Ser. No. 504,991, Sept. 11, 1974, abandoned.

[30] Foreign Application Priority Data

Sept. 9, 1975  Switzerland ................ 11686/75
Sept. 9, 1975  Switzerland ................ 11686/75

[51] Int. Cl.[2] ................ B23B 51/06; B23B 47/34
[52] U.S. Cl. .................................. 408/61; 51/273;
  90/12 D; 408/67; 408/110; 408/710
[58] Field of Search .............. 408/110, 111, 112, 56,
  408/61, 67, 710; 90/11 R, 12 D; 51/273, 170 T

[56] References Cited

U.S. PATENT DOCUMENTS

| 1,452,779 | 4/1923 | Barry ...................... 408/61 X |
| 1,563,887 | 12/1925 | Wiespetat .................. 408/710 X |
| 1,955,182 | 4/1934 | Hall ......................... 408/56 |
| 2,944,465 | 7/1960 | Jones ........................ 90/11 R |
| 3,413,875 | 12/1968 | Larson ....................... 408/61 |
| 3,547,350 | 12/1970 | Marcoux .................... 408/61 X |
| 3,673,744 | 7/1972 | Oimoen ..................... 51/273 X |
| 3,786,846 | 1/1974 | Mehring .................... 51/273 X |

FOREIGN PATENT DOCUMENTS

| 562,277 | 11/1957 | Belgium .................... 408/56 |
| 869,256 | 1/1942 | France ...................... 408/56 |
| 455,772 | 2/1928 | Germany ................... 408/61 |
| 182,934 | 3/1963 | Sweden ..................... 408/110 |

*Primary Examiner*—L. Howard Flint, Jr.
*Assistant Examiner*—W. R. Briggs
*Attorney, Agent, or Firm*—Robert E. Burns; Emmanuel J. Lobato; Bruce L. Adams

[57] ABSTRACT

A drilling or milling machine has a suction chamber surrounding an axially moveable tool, the chamber being axially moveable relative to the tool and spring biased for abutment against a working surface during machining, after the tool has been fed forwardly in a rapid first phase, then slowly just prior to and during machining. The chamber is composed of two half-shells secured onto a mount on the tool body by a locking ring, and which can be separated by removal of the ring and radial outward movement to provide access to the tool without a need to raise the tool body. The abutment-surface of the chamber may be rigid for laterally-stationary tools, or formed of a ring of flexible bristles for laterally moving tools, e.g. for routing printed circuits. Several compressed-fluid delivery nozzles can be provided in the suction chamber to improve the removal of dust and chippings.

16 Claims, 7 Drawing Figures

MACHINE TOOLS

BACKGROUND OF THE DISCLOSURE

This application is a Continuation-in-Part of my earlier application Ser. No. 504,991, filed Sept. 11, 1974, now abandoned.

This invention relates to machine tools such as drilling and milling machines with an axially-moveable rotatable tool having disposed about the tool a suction chamber which is able to abut against a work surface during machining to remove chippings and dust particles.

In known machine tools of this type, if acess must be had to the tool, for example to change it, the machine-tool body must be axially moved away from the work surface by a sufficient amount to allow an axial removal of the suction chamber. This operation is inconvenient and time consuming and one object of the invention is to provide a simplification by enabling removal of the suction chamber without a need to raise the machine-tool body.

SUMMARY OF THE INVENTION

An object of the invention is to provide an improvement in the removal of chippings and dust particles by combining the suction removal with blowing of a compressed fluid generally towards the operative point of machining of the tool.

These features of the invention may be incorporated in a drilling, milling or similar machine tool for operating with a given fixed transverse alignment to the workpieces, or to such machine tools provided with a deformable forward abutment surface able to move laterally over uneven workpieces and/or workpiece holders, e.g. routing machines for machining printed circuits.

BRIEF DESCRIPTION OF THE DRAWINGS

Embodiments of the invention will now be described in detail, and by way of example, with reference to the accompanying drawings, in which.

DESCRIPTION OF THE PREFERRED EMBODIMENT

Figure 1:
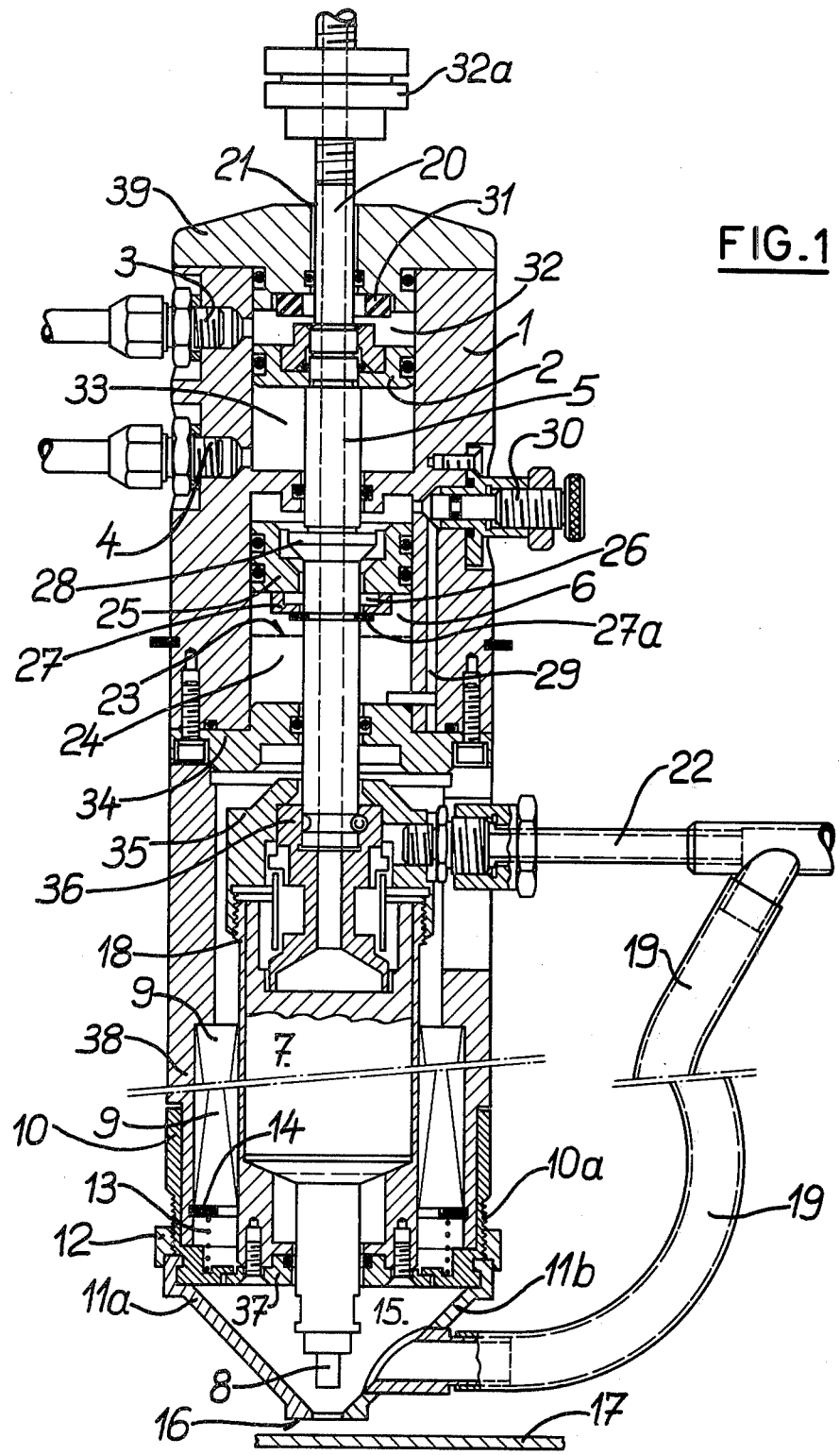
FIG. 1 is an axial cross-section through a first embodiment of machine tool.

The upper part of the drilling machine shown in FIG. 1 comprises a vertically directed pneumatic cylinder 1, which is closed at its upper end by a cover 39 and in which a piston 2 is mounted axially displaceable. Attached to piston 2 are an upper piston rod 21 and a lower piston rod 5. The upper piston rod 21 extends through a chamber part 32 above the piston 2 as well as the cover 39 and projects upwards from the machine. The lower piston rod 5 passes through a chamber part 33 below the piston 2 as well as a further separate cylinder chamber 6 provided in the cylinder 1 and an intermediate wall 34 forming the base of cylinder chamber 6. At its lower end, rod 5 supports a tool head 7 with a drilling tool 8 attached by means of a nut 35 and collar 36. The tool head 7 comprises a pneumatic motor for driving tool 8.

Upward and downward movement of the piston 2 with its piston rods and thus the movement of tool head 7 with tool 8 is controlled by compressed air feed pipes 3 and 4 which open respectively into the chamber regions 32, 33.

Figure 2:
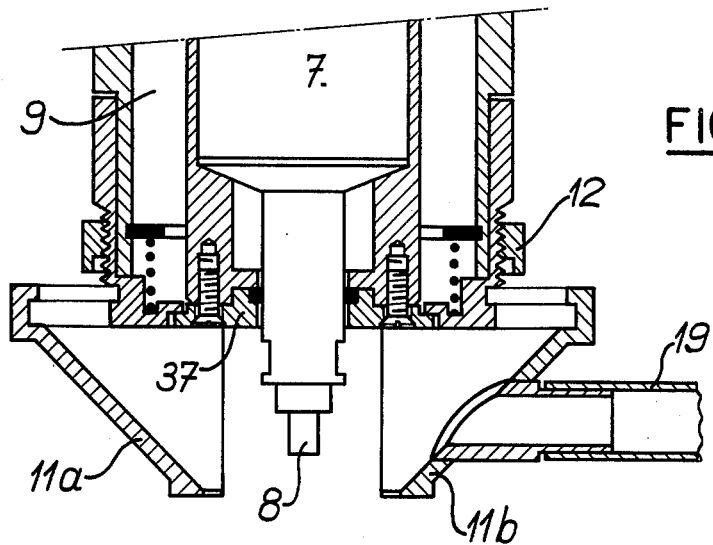
FIG. 2 is an axial cross-section, on an enlarged scale, of the lower part of FIG. 1 during removal of the suction chamber.

The tool head 7 is surrounded by a tubular housing 38 attached to the underside of cylinder 1. A ball bearing 9 seated in housing 38 serves for guiding the tool head 7 during the feed movement, a guide bushing 18 being provided surrounding the tool head 7 for the purpose of exact centering. Mounted to be axially slidably movable about the lower region of the housing 38 is a bushing 10, on whose lower end two conical complementary half shells 11a and 11b are detachably connected to form a closed chamber 15 surrounding the tool 8. Mounted to be axialy displaceable on the bushing 10 is a securing ring 12 which, in this example is screwed on an external screw thread 10a. To attach the two half shells 11a, 11b, the ring 12 is screwed down to the position shown in FIG. 1 and in this position overlaps an upper rim of the half shells 11a, 11b and presses them against the bushing 10. The half shells 11a, 11b may be simply released from the bushing 10 by screwing the securing ring 12 upwards, as shown in FIG. 2 whereby the half-shells 11a and 11b may be removed by separating them with a radial movement. A helical spring 13 located inside the housing 38 bears by its upper end against a stationary abutment 14 in housing 38 and by its lower end against an annular inwardly-directed shoulder of the bushing 10 which, by its inner edge, overlaps a perforated disc 37 attached to the guide bushing 18 of the tool head 7. This perforated disc 37 surrounds the lower region of the head 7 with the interposition of a gasket. The flat lower surface 16 of the two half shells 11a, 11b forms a contact surface provided with a central opening for guiding tool 8, by which the half shells 11a, 11b bear against a diagrammatically-shown workpiece 17 to be machined, when the tool 8 is moved down, and under the action of the spring 13. When the tool 8 moves down from the raised position illustrated in FIG. 1, the half shells 11a, 11b, together with the securing ring 12 and the bushing 10 which slides on the housing 38, follow it under the action of the spring 13, until the lower contact surface 16 of half shells 11a, 11b bears against workpiece 17, The tool head 7 with the tool 8 then continues the feed movement to come into contact with the workpiece 17 for the actual machining stage. When, after completion of machining, the tool head 7 with the tool 8 is raised once more, in the last stage of this return movement, the perforated disc 37 moves the bushing 10 up together with the half shells 11a, 11b, by cancelling the action of the spring 13, so that the workpiece 17 is released.

In the working position of the two half shells 11a, 11b, i.e. when the latter bear against the workpiece 17 by their contact surface 16, a chamber 15 completely surrounding the tool 8 is formed, from which the turnings or drilling residue are removed during machining by a suction pipe 19.

The supply of compressed air to the pneumatic motor in the tool head 7 driving tool 8 takes place along a central bore through piston rods 20 and 5. In this manner, separate compressed air pipes obstructing the handling of the machine are eliminated. The discharge of compressed air from the motor takes place through a pipe 22, into which the aforementioned suction pipe 19 leads.

The cylinder chamber 6 located below the chamber for the piston 2 is filled with a fluid 24, preferably oil, up to the level shown in a dashed line and designated by reference numerals 23, and contains a piston-like slide 25 surrounding the piston rod 5 with clearance. Downward movement of the slide 25 relative to the piston rod 5 is limited by abutment against a projection 27 provided with transverse openings 26 and bearing on a clip 27a attached to the piston rod 5. A stepped bore with a conical portion or seat provided in the upper region of the slide 25 co-operates with an annular shoulder 28 provided on the piston rod 5, which shoulder is conical on its underside. In the position illustrated in FIG. 1, the annular shoulder 28 is unseated from the step bore of slide 25 so that there is a connection between the upper part of cylinder chamber 6 above the slide 25 and the lower part of cylinder chamber 6 below the slide 25. The lower and upper parts of the cylinder chamber 6 are interconnected by a secondary duct 29 in cylinder 1 and in which an externally adjustable throughflow valve 30 is located.

In its upper, raised inoperative position, the piston 2 bears against a stop 31. The desired entire feed movement of the piston 2 and thus of the tool 8 may be adjusted by an adjustable stop 32a, which is located on the external upper part of piston rod 20. As shown, said part of rod 20 is provided with a screw thread and stop 32 is in the form of a double nut which comes to bear against the upper face of cover 39 at the end of the desired feed movement.

The described machine operates as follows:

After the desired feed length has been preset, it is ensured that a sufficient quantity of liquid, for example oil, is located in the cylinder chamber 6 such that in the raised inoperative position of piston 2, the space between the underside of slide 25 and the liquid level 23 is less than the distance of the lower point of tool 8 from the surface of workpiece 17. When compressed air is delivered through the pipe 3 to the piston 2, the latter firstly moves downwards at a relatively high speed, since during the first feed phase, the slide 25 entrained by the annular shoulder 28 after travel of a short initial distance, must solely compress the air located between the slide 25 and the liquid level 23, a certain small amount of liquid passing along duct 29. However, this relativley rapid feed movement is substantially damped in the second feed phase, namely when the slide 25 contacts and must displace the liquid 24 from the chamber 6 during its further movement. By a corresponding adjustment of the cross section of flow of the valve 30, the speed at which the liquid 24 may be displaced from the chamber 6 can be adjusted. This second damped feed phase corresponds to movement of the tool 8 into contact of the workpiece 17 and penetration of tool 8 into workpiece 17, i.e. the actual machining stage. In this manner, it is thus ensured that the tool 8 firstly moves downwards quickly but comes to bear on the workpiece 17 and carries out a feed movement during the actual machining in a gentle manner predetermined by the adjustable displacement speed of liquid 24. The displaced liquid passes through valve 30 into the upper region of the chamber 6 above the slide 25 and later, when, after completed machining, the piston 2 is once more raised by supplying compressed air through pipe 4, may freely flow back into the lower region of the chamber 6, because during this movement, the annular shoulder 28 is raised from the conical seat of the slide 25 and thus connects the upper and lower region of the chamber 6. During this upwards movement of the piston rod 5, the slide is entrained by the clip 27a, and communication between the upper and lower regions of cylinder chamber 6 is closed by seating the annular shoulder 28 against the conical seat of slide 25, so that when the piston 2 with its piston rod 5 is moved back down, i.e. carries out its actual feed movement, no liquid 24 may pass directly through slide 25 into the upper region of chamber 6.

Figure 3:
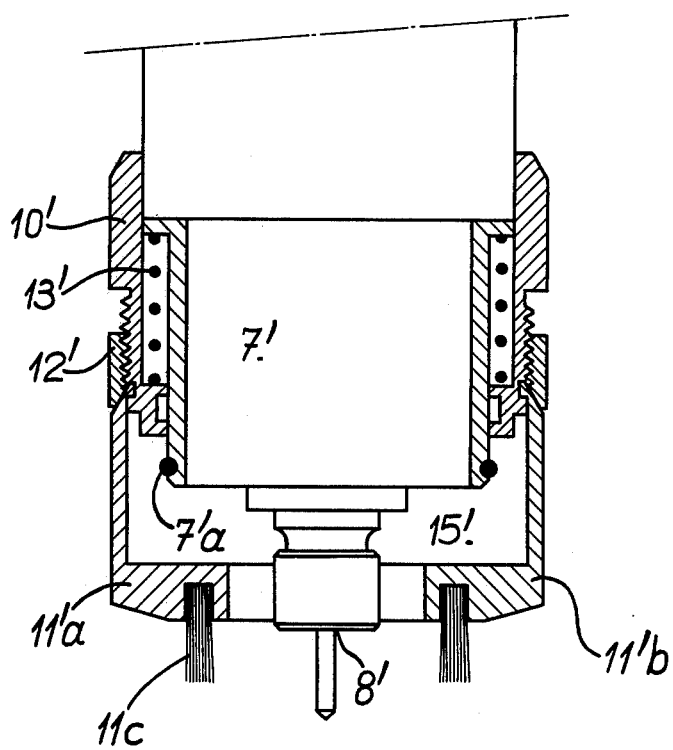
FIG. 3 is an axial cross-section of the lower part of a second embodiment.

The described drilling machine is particularly suitable for machining stationary workpieces but may be modified, as shown in FIG. 3, for the machining and routing of, for example, printed circuits. In FIG. 3, parts corresponding to those of FIGS. 1 and 2 are designated by the same references with a prime.

In the embodiment of FIG. 3 the two half shells 11'a and 11'b are of generally cylindrical shape, rather than conical as in FIGS. 1 and 2, with an inwardly-directed lower flange having a central opening for tool 8' surrounded by a ring of downwardly-protruding bristles 11c. A suction pipe, not shown, is connected to the thus-formed chamber 15.' The outer upper edge of the half shells 11'a, 11'b is bevelled and cooperates with a corresponding bevel on screwed ring 12' to firmly hold the half-shells in place by engagement of an inwardly-projecting rim on a corresponding outwardly directed rim of the bushing 10.

In the modification of FIG. 3, spring 13' acts between an upper outwardly-directedn flange of the tool head 7' and a lower inwardly-directed flange of 10'. The downward movement of 10' and hence half shells 11'a, 11'b relative to the tool head 7' and the tool 8' is limited by a stop-forming ring 7'a on the tool head 7'.

In operation, when the tool head 7' is lowered, the ring of bristles 11'c comes to bear against the workpiece or workpiece table and under the action of spring 13' provides a substantially impervious flexible curtain allowing lateral movement of the machine relative to uneven workpieces by deformation of bristles 11'c, and also allowing removal via the suction pipe of waste chippings and so on produced during machining.

As before, if it is necessary to change or attend to the tol 8', this can be done by unscrewing ring 12' and removing half-shells 11'a and 11'b with a lateral movement to have a access to tool 8', without a need to raise the main body of the machine.

Figure 4:
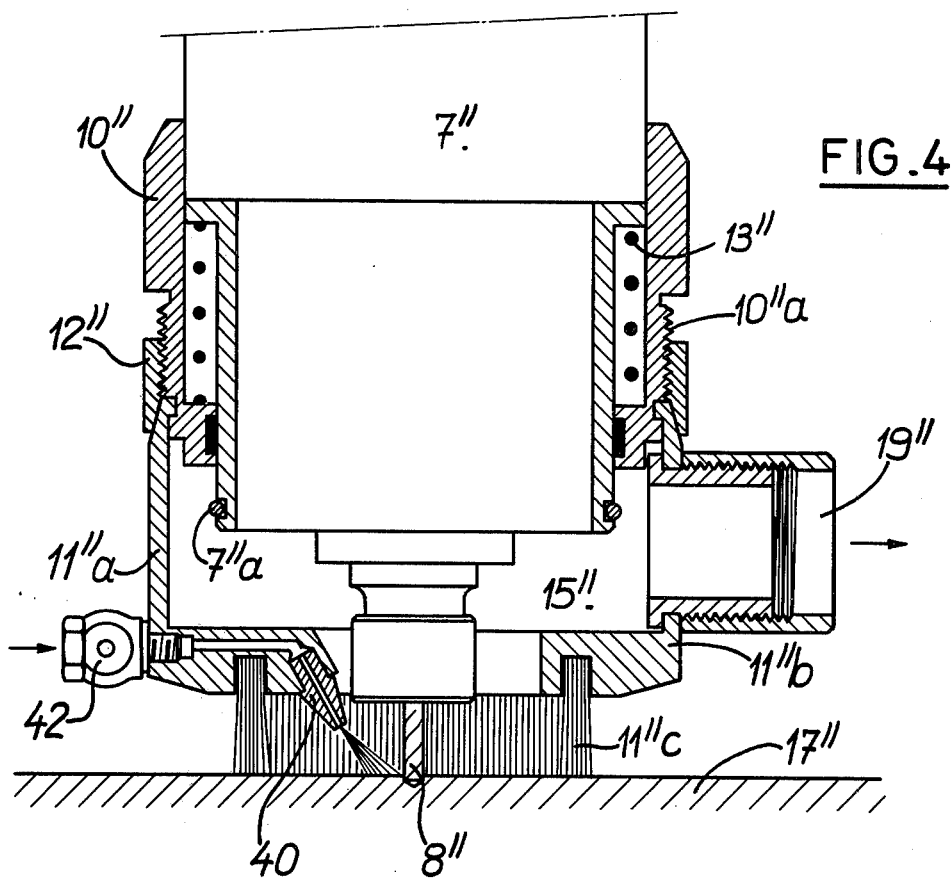
FIG. 4 is a similar view of a third embodiment.
Figure 5:
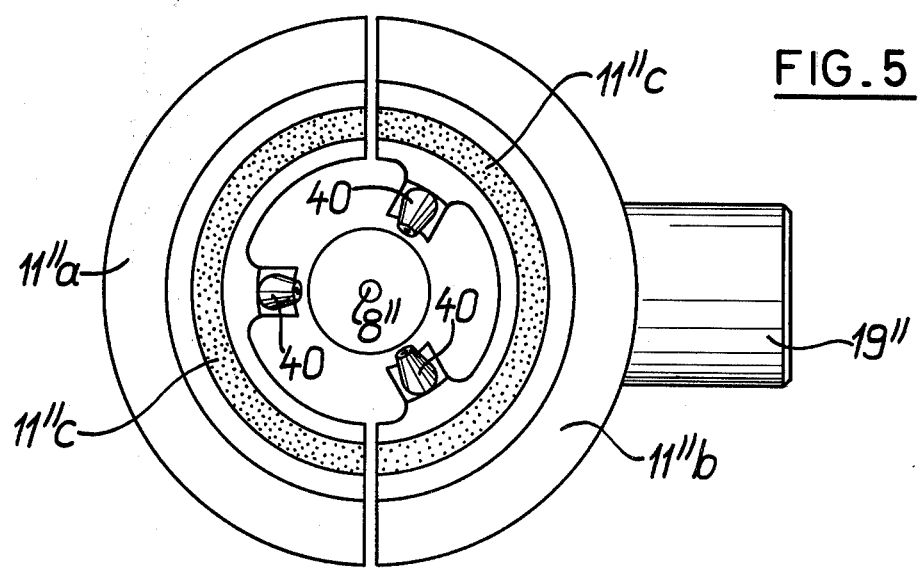
FIG. 5 is an underneath plan view of FIG. 4.
Figure 6:
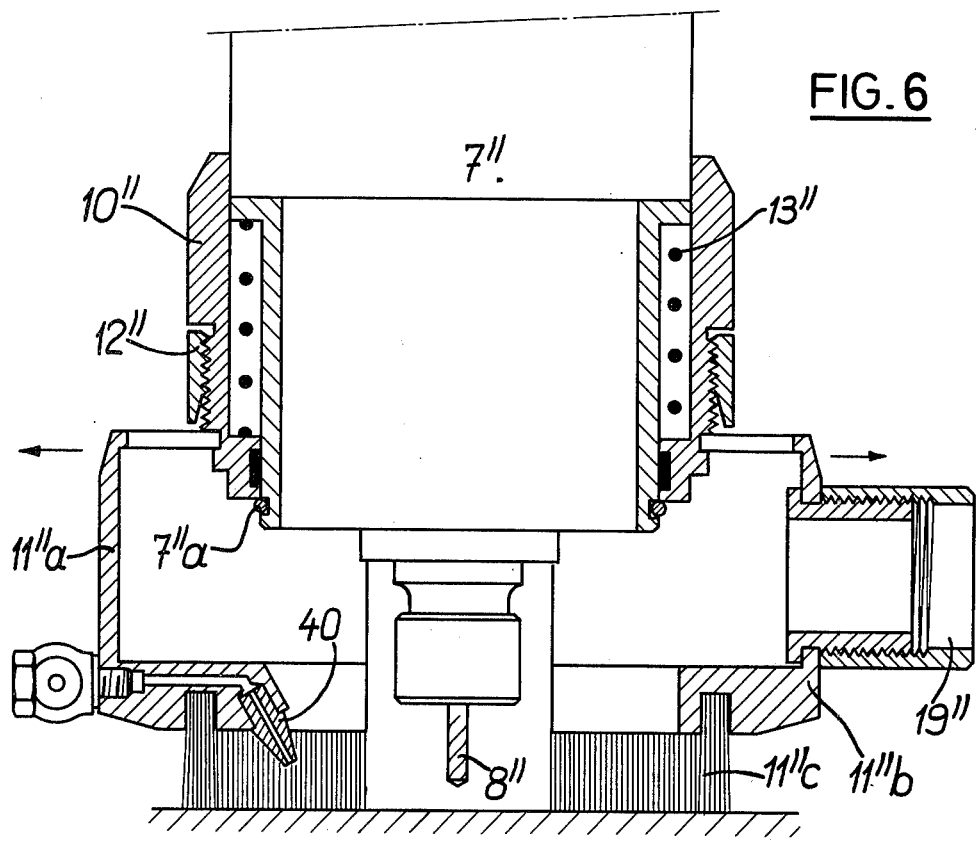
FIG. 6 is a view similar to FIG. 4, during removal of the suction chamber.

FIGS. 4 to 6 show the lower part of a third embodiment, in which the same parts as before are designated by the same references with double prime. This third embodiment is akin to the second in that the suction chamber has a lower ring of bristles 11"c forming a flexible bearing surface for the suction chamber, and the same spring-biased mount and with a bevelled ring 12" for securing the half-shells 11"a and 11"b. However, in addition to the suction outlet 19", this embodiment has within chamber 15" three nozzles 40 disposed at 120° to one another about the axis of tool 8", these nozzles being oriented radially inwardly and axially outwards towards the center of the opening of the ring of bristles 11"c, i.e. substantially around the operative point of machining where tool 8" acts on workpiece 17". The nozzles 40 are each connected via a duct 41 machined in the thickness of the wall of the respective half-shell 11"a or 11"b and a connector 42 to a source of compressed air, for example the pipe 22 of FIG. 1 in a manner to deliver jets of compressed air towards said operative point of machining. The rate of supply of compressed air to nozzles 40 is arranged to be less than the rate of removal of air from outlet 19", so that an overall state of suction is maintained within chamber 15" during machining. The ring of bristles 11"c provides a substantially air-tight and flexible barrier between the inside of chamber 15" and the ambient air to enable this suction effect to be maintained; the joint between bristles 11'c and the workpiece or work surface 17" need not however be absolutely air-tight and a small flow of air through the bristles is acceptable. The combined blowing and suction ensures a very effective evacuation of all waste chippings and dust, since the jets from nozzles 40 ensure a complete removal of chippings and dust even from finely grooved workpieces or work surfaces, for which previously the suction effect was not always sufficient.

Furthermore, the jets from nozzles act to cool the tool 8" in the machining zone. This is particularly useful when the workpiece is in poorly heat conducting material, which for example is the case for printed circuits and sheets of Plexiglass (Trade Mark), so that the heat produced has to be mainly dissipated via the tool. Hence, all other conditions being equal, this additional cooling effect enables an increase in the machining speed, and an increase the useful tool life, particularly for very high speed tools.

As shown in FIG. 6, the half-shells 11"a and 11"b of this third embodiment can, as before, be easily radially removed by unscrewing ring 12", without a need to raise the main body of the machine. The pipes connected to outlet 19" and connector 42 are preferably flexible to facilitate this removal of the two half-shells.

The provision of the flexible substantially impervious ring of bristles in the second and third embodiments is particularly useful when the machine tool is used as a routing machine for machining printed circuits, since this ring of bristles allows a transverse translational movement of the machine tool parallel to the work surface, the bristles deforming to pass over any projections on the surface or workpieces without a breakdown in the relative vacuum in the suction chamber. However, other forms of flexible bearing surfaces are possible, for example a skirt of flexible material, for example a self-lubrificating synthetic material, for example a polyamide such as nylon, an acetyl resin such as Delrin (Trade Mark), P.T.F.E. (Teflon, Trade Mark) or a synthetic or natural rubber. Another possibility is to provide an axially-movably mounted ring of soft material which will not scratch the work surface or workpieces, and rests by its own weight or by a spring action on the work surface, and has bevelled or rounded edges so as to be able to move up slightly if it encounters a projection on the work surface.

In these embodiments with a brush-like or other flexible lower bearing surface, it may some cases be possible to dispense with the spring downwardly biasing the suction chamber, and it may even be possible to provide a fixed mount for the suction chamber, i.e. without a possibility of sliding axially relative of the tool or tool body.

Figure 7:
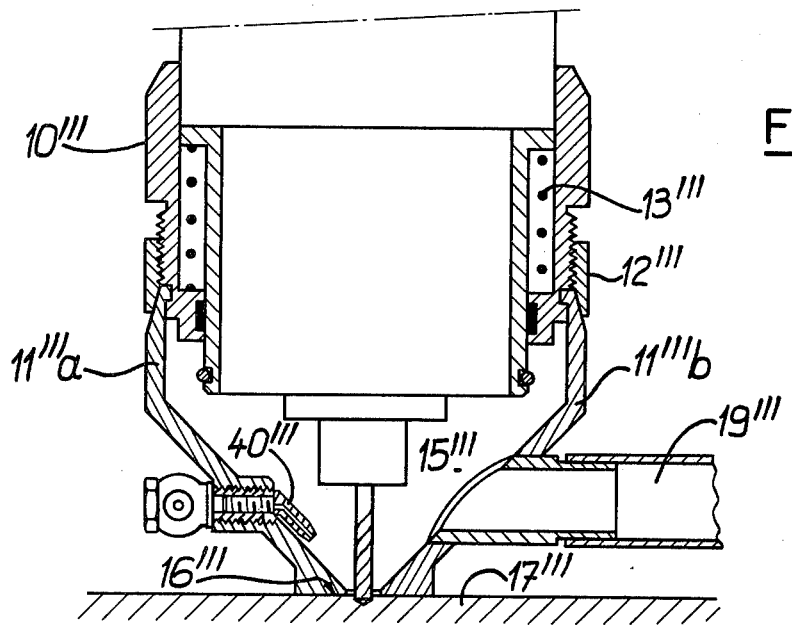
FIG. 7 is an axial cross-section of the lower part of a fourth embodiment.

FIG. 7 shows an embodiment with the same spring-biased suction chamber mount as the second and third embodiments, but with a rigid forward bearing surface, as in the first embodiment, the same parts being designated by the same references with a triple prime. In this embodiment, half-shells 11'''a and 11'''b forming the suction chamber have conical walls tapering to rigid abutment face 16'''. In use, face 16'" applies against work face 17'" under the action of spring 13''', although the joint between these faces is not perfectly air-tight and a small flow of air into chamber 15''' is acceptable. In the walls of half-shells 11'''a and 11'''b are apertures receiving three nozzles 40''' at 120° to one another and oriented as before towards the operative point of machining, and a single suction outlet 19'''. As for the first embodiment, there is no provision for relative lateral movement of the machine over the workpiece or work surface 17'''.

As a variation of the third and fourth embodiments, there can be a different number of compressed-air nozzles than three, and the nozzle(s) may be assymetric. Also, for some uses, instead of delivering compressed air, the nozzles could supply another compressed fluid, for example an air/water or air/oil aerosol, i.e. a fine mist of droplets of water or oil. Such aerosols prove advantageous when the waste is mainly in the form of chippings, whereas when the waste is mainly a fine powder, compressed air alone may be preferred.

In all of the described embodiments the half-shells forming the suction chamber engage by an inwardly-protruding rim or flange engaging in a circular peripheral groove in the mounting member formed by bush 10. Together with the locking ring, this provides an adequate and secure fitting of the half-shells in a simple manner, while allowing easy removal thereof in a radial direction after unscrewing the locking ring.

Removing of the suction chamber to change or attend to the tool can thus be achieved simply and quickly, without a need to raise the main body of the machine tool.

Although the embodiments of FIGS. 3 to 7 may advantageously be incorporated in a machine tool with tool-feeding arrangement as described with reference to FIG. 1, other tool feeding arrangements are possible. Also the described two-phase tool feed achieved by filling oil in chamber 6 of FIG. 1 to a selected in level 23 could be replaced by a uniform-speed feed by fully filling this chamber with oil.

I claim:

1. A machine tool comprising, a hollow cylindrical body, a rotary driven tool mounted within said body for axial movement in use towards and away from a work surface, a suction chamber disposed about said tool and having means defining a central aperture for passage of the tool and a forward abutment surface for abutment against the work surface, means mounting said chamber for axial movement relative to said body and said tool, means resiliently biasing said chamber in a direction corresponding to a direction towards the work surface, stop means defining a forwardmost position of said chamber relative to said tool, said suction chamber comprising a plurality of complementary chamber sections each extending about a given portion of the circumferential extent of said chamber, means removably securing said chamber sections together and to said mounting means to allow removal of said chamber sections from said mounting means by a generally radial outward movement of said sections relative to said tool, said mounting means including an annular member mounted for axial movement relative to said body and said tool and subjected to the action of said biasing means, said annular member having an externally screw-threaded outer face and a lower edge with an outwardly-facing circular groove, said chamber sections when assembled having a circular upper edge with an inwardly-directed circular flange which rests in said groove of the annular member, and a screw ring threadably engaged on said outer face of the annular member, said screw ringn having a non-threaded clamping portion engageable about said upper edge of said chamber sections.

2. A machine tool according to claim 1, in which said clamping portion of the screw ring and said upper edge of said chamber sections have complementary inner and outer bevelled faces respectively.

3. A machine tool according to claim 1, in which said chamber sections carry a deformable ring forming said forward abutment surface.

4. A machine tool according to claim 3, in which said deformable ring is formed of flexible bristles.

5. A machine tool according to claim 1, comprising at least one compressed-fluid delivery nozzle disposed within said suction chamber oriented radially inwardly and axially outwards towards the center of said aperture.

6. A machine tool according to claim 5, comprising for each said nozzle means defining a compressed-fluid delivery duct in the thickness of a said chamber section.

7. A machine tool according to claim 1, comprising three said nozzles arranged at 120° to one another about the axis of said tool.

8. A machine tool according to claim 1, comprising means supplying compressed fluid to said nozzles at a rate to maintain an overall suction in said chamber when said abutment surface of said chamber is applied against a working surface.

9. A machine tool according to claim 1, in which said chamber carries a deformable ring forming said forward abutment surface.

10. A machine tool according to claim 9, in which said deformable ring is formed of flexible bristles.

11. A machine tool according to claim 1, comprising at least one compressed-fluid delivery nozzle disposed within said suction chamber oriented radially inwardly and axially outwards towards the center of said aperture.

12. A machine tool according to claim 11, said nozzle means defining a compressed-fluid delivery duct in the thickness of a said chamber section.

13. A machine tool comprising, a hollow cylindrical body, a rotary driven tool mounted within said body for axial movement in use towards and away from a workpiece, means defining a suction chamber disposed circumferentially and axially about said tool and having means for defining a passage for passage of the tool selectively exteriorly of the chamber and a forward abutment surface for abutment against the workpiece, mounting means mounting said chamber on said body for axial movement relative to said body and said tool, means resiliently biasing said chamber in a direction corresponding to a direction for said abutment surface to abut the workpiece, means limiting a forwardmost position of said chamber relative to said tool, means defining said suction chamber comprising a plurality of complementary means defining chamber sections each extending about a given different portion of the circumferential extent of said chamber, means for removably securing said chamber sections together and to said mounting means to allow removal of said chamber sections from said mounting means by a generally radial outward movement of said sections relative to said tool, said mounting means including an annular member mounted for axial movement relative to said body and said tool and having a circumferential surface complementary to a surface of said chamber sections to thereby removably engage said chamber sections, and ring means axially movable on the annular member between a clamping position to engage and secure the chamber sections to the annular member and a position to allow removal of said chamber sections.

14. A machine tool according to claim 13, including at least one nozzle on said means defining the suction chamber for applying a fluid under pressure in the vicinity of the tool to assist in the evacuation of chips and dust.

15. A machine tool according to claim 13, including means defining a deformable ring defining said abutment surface.

16. A machine tool according to claim 15, in which said deformable ring comprises a plurality of close adjacent flexible bristles arranged in a ring configuration.

* * * * *